United States Patent [19]
Stirrup

[11] Patent Number: 5,942,021
[45] Date of Patent: Aug. 24, 1999

[54] SYSTEM FOR ADMINISTRATION OF NUTRIENTS TO PLANTS

[76] Inventor: Marion Stirrup, P.O. Box 1980, Kodiak, Ak. 99615

[21] Appl. No.: 08/694,926

[22] Filed: Aug. 8, 1996

Related U.S. Application Data

[60] Provisional application No. 60/002,060, Aug. 9, 1995.

[51] Int. Cl.$^6$ .............. C05B 17/00; C05D 1/00; C05F 1/00; C05F 11/00
[52] U.S. Cl. .............. 71/1; 47/48.5; 47/62; 71/11; 71/16; 71/23; 71/31; 71/32; 71/54; 71/61
[58] Field of Search .................. 71/63, 1, 903, 71/904, 11, 16, 23, 31, 32, 54, 61; 47/62, 48.5; 222/92

[56] References Cited

U.S. PATENT DOCUMENTS

| | | | |
|---|---|---|---|
| 2,820,671 | 1/1958 | McFarland | 299/83 |
| 3,436,345 | 4/1969 | Goodenough et al. | 210/62 |
| 4,077,511 | 3/1978 | Mosijowsky | 206/0.5 |
| 4,218,843 | 8/1980 | Clarke, Jr. | 43/131 |
| 4,659,495 | 4/1987 | Figliola | 252/90 |
| 4,793,474 | 12/1988 | Drake | 206/0.5 |
| 5,022,182 | 6/1991 | Anderson | 47/48.5 |
| 5,252,302 | 10/1993 | Schmidt et al. | 422/261 |
| 5,317,834 | 6/1994 | Anderson | 47/48.5 |

FOREIGN PATENT DOCUMENTS

| | | | |
|---|---|---|---|
| 2021782 | 1/1987 | Japan | 71/63 |

*Primary Examiner*—Wayne Langel
*Attorney, Agent, or Firm*—Seed and Berry LLP

[57] ABSTRACT

Methods, devices and compositions directed to the delivery of a preferably organic formulation of plant nutrients to indoor and outdoor potted plants, cut flowers, vegetable, herb, and flower seedlings, and other types of plants. The methods, devices and compositions form a simple, safe, non-toxic, cost effective and easy to use delivery system comprising the use of a plant nutrient composition. The plant nutrient composition is typically dry and is maintained in a plant nutrient delivery system during storage and shipping. When ready for use, the plant nutrient composition is contacted with hot water to release the plant nutrients retained within the plant nutrient composition, and the resulting infusion is cooled, and then administered to the plants.

14 Claims, 5 Drawing Sheets

Fig. 1

1. Ambient H2O (10 minutes)
2. Ambient H2O (8 hours)
3. Boiling H2O (10 minutes)

*Fig. 2*

1. Ambient H2O (10 minutes)
2. Ambient H2O (8 hours)
3. Boiling H2O (10 minutes)

1. Ambient H2O (10 minutes)
2. Ambient H2O (8 hours)
3. Boiling H2O (10 minutes)

SYSTEM FOR ADMINISTRATION OF NUTRIENTS TO PLANTS

CROSS REFERENCE TO RELATED APPLICATION

This application claims the benefit of U.S. Provisional Patent Application Ser. No. 60/002,060, filed on Aug. 9, 1995, which is hereby incorporated by reference in its entirety.

TECHNICAL FIELD

The present invention relates generally to methods, devices and compositions for the administration of nutrients to plants.

BACKGROUND OF THE INVENTION

Organic fertilizers, particularly those manufactured for the home gardener, are generally available in a dry granular form. They are traditionally sold as separate fertilizer components, resulting in an incomplete supply of nutrients to plants. Thus, to administer a complete, or near-complete, fertilizer the user is faced with concocting his or her own mixture. This is a time-consuming, impractical and inconvenient method of preparing a plant food, especially for house plants and other smaller scale applications. Additionally, the user must purchase a multitude of packages of single components, which purchase requires a greater expenditure than if a complete fertilizer could be obtained. The necessity of blending ingredients at the site of use also increases the likelihood of inconsistent results from one batch of fertilizer to the next. Further, when the fertilizer is supplied in granular form, the fertilizer is normally added to the soil at ambient temperatures, thereby limiting the solubility of the materials in the fertilizer. This can be disadvantageous because the availability of many of the nutrients in the fertilizer to the plant may be determined by microbial decomposition of the materials from the organic fertilizer, and decreased solubility results in a decreased availability of the materials to the microbes. Still further, previous attempts to create complete or near-complete fertilizer blends have not addressed the need for convenience in any of handling, shipping or storage, when used with house plants, seedlings, and other small scale applications.

The provision of a complete, or near complete, organic fertilizer is problematic in part because of the wide variety of nutrients that are necessary for healthy plant growth. For example, about 60 of the atomic elements have been found in plants, although it is believed that only 16 of these elements are essential for growth of the plant. Of the 16 essential elements, plants typically obtain carbon, hydrogen and oxygen from water and air, while the 13 remaining essential elements are obtained from the soil. These 13 essential elements may be classified as macronutrients, which are required in relatively large quantities, and micronutrients, which are required in relatively small quantities. The macronutrients include the six essential elements nitrogen, phosphorous, potassium, calcium, magnesium and sulfur. The seven micronutrients include iron, manganese, boron, copper, zinc, molybdenum and chlorine. The elements are typically provided to plants via the use of organic or inorganic fertilizers.

Inorganic, synthetic fertilizers are also available for provision of certain of the essential elements to plants, but also fail to provide a complete, or near-complete, fertilizer for the plant. Such inorganic fertilizers are available in a wide variety of commercial brands, and are typically provided in a powder, liquid or tablet form. Inorganic fertilizers typically provide ample amounts of three of the macronutrients (nitrogen, phosphorous and potassium), and are typically easy to apply. Such inorganic fertilizers, however, supply only the nutrient elements guaranteed on the label. Additionally, the inorganic fertilizers do not contribute to the structure or texture of the soil or potting mixture, and they do not adequately support the growth and reproduction of the microbes found in the soil that are helpful, often essential, for the growth of the plants. Further, such inorganic fertilizers can burn plant roots if misapplied, and can cause excessive salt build up on plant pots.

Organic gardening techniques are typically preferred over inorganic techniques because the organic techniques more closely resemble processes that naturally occur in nature. Additionally, the use of organic materials stimulate the growth and reproductive capacity of the microbes in the soil, thereby helping to create vital and productive soil.

Accordingly, there has gone unmet a need for an organic plant nutrient composition that provides a complete, or near-complete, organic fertilizer formulation that addresses the whole needs of the plant.

There has also gone unmet a need for a plant nutrient delivery system that addresses the need for convenience in handling, shipping and storage, such as where an organic fertilizer is dry for handling, shipping and storage, but is liquid for administration at a single time to a plant.

There has further gone unmet a need for a method capable of rapidly and effectively extracting essential plant nutrients from an organic composition such that nutrients are made readily available to the plant.

There has additionally gone unmet a need for a method capable of extracting essential plant nutrients from an organic composition such that a predictable amount of nutrients is made available for administration to a plant.

There has also gone unmet a need for a complete or near-complete organic plant nutrient composition that is convenient to prepare and easy to administer to a plant.

SUMMARY OF THE INVENTION

The present invention provides compositions, methods and devices directed to a complete, or near-complete, plant nutrient composition that is able to be handled, shipped and stored dry, but that can be contacted with hot water and administered in liquid form to the plant. The methods, devices and compositions form a simple, safe, non-toxic, cost effective, and easy to use system for the administration of organic nutrients to plants. Also, the use of the hot water is particularly advantageous for the extraction and production of the nutrients from the composition.

Thus, in a one aspect, the present invention provides a method of administering nutrients to a plant, comprising: a) selecting a composition comprising a plurality of ingredients containing nutrients that enhance the health of the plant, wherein the nutrients are released from the ingredients upon contact with hot water; b) contacting the plant nutrient composition with the hot water for a time sufficient to release the nutrients from the ingredients to provide a nutrient concentrate comprising the water and the nutrients; and c) administering the nutrient concentrate to the plant.

In preferred embodiments of this and all other aspects of the invention, the step of selecting further comprises selecting the ingredients such that the ingredients are substantially dry. Further, the step of selecting preferably comprises selecting the ingredients such that the ingredients contain the releasable nutrients nitrogen, phosphorous, potassium, calcium, magnesium and sulfur, and firther preferably comprises selecting the ingredients such that the ingredients contain one or more, preferably all, releasable nutrients selected from the group consisting of iron, manganese, boron, copper, zinc, molybdenum and chlorine.

In other preferred embodiments, in this and all other aspects of the invention, the step of selecting further comprises selecting the organic ingredients such that the ingredients comprise kelp, greensand, rock phosphate and fish bone meal, and further preferably comprises selecting the ingredients such that the ingredients further comprise one or more, preferably all, of beet, carrot, zucchini, yellow yarrow, onion, parsley and oak leaves. The step of selecting further preferably comprises selecting the ingredients such that the ingredients further comprise one or more of okra, sage, poppy seeds, ground cherry seeds, ground apple seeds, crocus leaves, tulip leaves, swamp flower, and pine shavings or sawdust.

In another embodiment, the method further comprises the step of cooling the nutrient concentrate to about room temperature before administering the nutrient concentrate to the plant. The method may further comprise the step of mixing the nutrient concentrate with additional water to provide a diluted mixture, and then administering the diluted mixture to the plant, such as by spraying the concentrate or diluted mixture from a spray bottle onto the plant. The step of administering may also comprise pouring the concentrate or diluted mixture on the plant or on soil adjacent the plant. The solution, the concentrate, or diluted mixture may be stored under refrigeration for up to two weeks.

In another aspect, the present invention provides a plant nutrient delivery system comprising a liquid-permeable envelope containing a plurality of substantially dry, organic ingredients that contain plant nutrients, wherein the ingredients are capable of retaining a plurality of the nutrients until the ingredients are contacted with hot water for a sufficient time to release the plurality of the nutrients from the ingredients, and then placing the ingredients within the liquid-perneable envelope.

In a further aspect, the present invention provides a plant nutrient delivery system produced by the following process: selecting a plant nutrient composition comprising a plurality of substantially dry ingredients containing nutrients that enhance the health of a plant, wherein the ingredients are capable of retaining a plurality of the nutrients until the ingredients are contacted with hot water for a sufficient time to release the plurality of the nutrients from the ingredients, and then placing the ingredients within the liquid-permeable envelope.

In a further aspect, the present invention provides a plant nutrient composition capable of enhancing the health of a plant, the plant nutrient composition comprising a plurality of substantially dry ingredients containing plant nutrients capable of retaining a plurality of the nutrients until the ingredients are contacted with hot water for a sufficient time to release the plurality of the nutrients from the ingredients.

In yet a further aspect, the present invention provides a kit comprising: a) a plant nutrient delivery system as described herein; and b) a water-impermeable enclosure containing the plant nutrient delivery system. In a preferred embodiment, the kit further comprises ground quartz crystal. The kit may further comprise a soil moisture indicator and/or a desiccant, which is preferably enclosed in a separate, liquid-permeable container from the plant nutrient delivery system.

In still yet a further aspect, the present invention provides a method of making a plant nutrient delivery system, comprising: a) selecting a plurality of ingredients containing a plurality of nutrients that enhance the health of the plant until the ingredients are contacted with hot water for a sufficient time to release the plurality of the nutrients from the ingredients; b) substantially drying the ingredients; c) increasing the surface area of the ingredients, such as by grinding, milling and sifting the ingredients, and blending the ingredients either before or after increasing the surface area; and d) placing the ingredients within a liquid-permeable envelope to produce the plant nutrient delivery system.

In further embodiments, the method further comprises the step of e) sealing the envelope to produce the plant nutrient delivery system. The plant nutrient delivery system may be placed in a carton, such as for storage or shipping.

These and other aspects of the present invention will become evident upon reference to the following detailed description and attached drawings.

DETAILED DESCRIPTION OF THE INVENTION

The present invention provides methods, devices and compositions directed to the delivery of a preferably natural organic fertilizer formulation of plant nutrients to house plants, cut flowers, potted herbs, seedlings, and other types of plants. The methods, devices and compositions form a simple, cost effective, safe, non-toxic, and easy to use system for the administration of nutrients to plants. The compositions are produced dry and are maintained in a plant nutrient delivery system during storage and shipping. When ready for use, the compositions are contacted with hot water to release and/or reform the plant nutrients retained within the compositions, and the resulting concentrated infusion is then typically cooled and then administered to the plants, or added to water used to moisten plants.

The use of hot, preferably boiling or near boiling, water to release the ingredients from the plant nutrient composition is particularly advantageous because it provides for rapid and effective release of desirable nutrients from the plant nutrient composition, and also releases and/or produces nutrients from the plant nutrient composition that are not released in a low-temperature system.

The materials comprising the plant nutrient composition are selected to include a plurality of organic ingredients or components that enhance the health of the plant, and preferably includes 13 essential elements, plus numerous helpful trace elements. The composition preferably is an organic fertilizer, which means materials containing carbon and one or more elements other than hydrogen and oxygen essential for plant growth. Further preferably, the composition is a natural organic fertilizer, which means materials derived from either plant or animal products containing one or more elements (other than carbon, hydrogen and oxygen) that are essential for plant growth. These materials are typically subjected to biological degradation processes under normal conditions of aging, rainfall, sun-curing, air drying, composting, rotting, enzymatic, or anaerobic/aerobic bacterial action, or any combination of these. In particular, the ingredients are selected to include the 6 essential macronutrients: nitrogen, phosphorous, potassium, calcium, magnesium and sulfur. The components are also selected to include the 7 micronutrients: iron, manganese, boron, copper, zinc, molybdenum and chlorine. Preferably, all 13 of these elements are included together. The components of the plant nutrient composition are also preferably selected to include trace elements required by beneficial soil bacteria, which bacteria can perform a variety of important functions such as fixing nitrogen, and breaking down larger particles into the soil and converting elements, thereby making them more readily available to plants.

Accordingly, in one aspect the present invention provides a plant nutrient composition capable of enhancing the health of a plant. The plant nutrient composition comprises a plurality of ingredients that contain plant nutrients that enhance the health of the plant. The ingredients of the plant nutrient composition are preferably substantially dry, which means that the weight and volume of the plant nutrient composition is not substantially comprised of water. The health of a plant has been enhanced when the plant shows an improved overall growth, vigor, blossoming, fruiting, root system or other indicator of enhanced health well known in the art. The plurality of ingredients generally includes at least 4 of the 13 essential elements discussed above, typically includes at least 7 of such essential elements, preferably includes at least 10 of such essential elements, and further preferably includes at least all 13 of such essential elements, as well as other elements such as trace elements that enhance beneficial bacteria.

The plant nutrients are contained within the plant nutrient composition, which means that a significant portion of the nutrients are retained in the plant nutrient composition until the plant nutrient composition is contacted with hot water, or other suitable liquid, preferably boiling or near boiling. The water is hot enough to extract and/or produce nutrients from the plant nutrient composition that are not released in a low-temperature system Generally, the water is heated to at least about 50° C., typically at least about 70° C., preferably at least about 80° C., and further preferably at least about 90° C. In order to determine whether a significant portion of the nutrients are retained within a plant nutrient composition absent contact with hot water, samples of a plant nutrient composition may be immersed in each of hot and cold water to provide sample concentrates, then the sample concentrates may be administered to essentially identical plants under essentially identical conditions. When the plant treated with the hot water concentrate shows an improved overall growth, vigor, blossoming, fruiting, root system or other indication of improved health, then the plant nutrient composition may be considered to retain a significant portion of the nutrients absent contact with the hot water.

In a convenient format, the water is heated to boiling immediately prior to contact with the plant nutrient composition, then the heated water is poured into a container along with the plant nutrient composition. As a lesser preferred alternative format, the plant nutrient composition may be combined with boiling water itself, which water is maintained as boiling during the immersion process. The plant nutrient composition is contacted with the hot water, or partially or totally immersed within the hot water, for a time sufficient to release the plant nutrients from the plant nutrient composition. Where the immersion is of a plant nutrient composition that retains a significant portion of the nutrients absent contact with hot water, then such time is that which is sufficient to release the significant portion of the nutrients that would otherwise be retained in the plant nutrient composition. Generally, such immersion occurs for about at least one minute, typically for at least about two minutes, preferably for at least about five minutes, and further preferably for about 10 minutes or longer. The concentrate produced by the immersion is then typically cooled such that the heat of the concentrate will not harm the plant to which the concentrate is to be administered. Preferably, the concentrate is cooled to ambient temperature, preferably room temperature. Additionally, if desired, the cooling may be accelerated, such as by placing the concentrate in a refrigerator or by adding ice cubes to the concentrate.

In one embodiment, the ingredients of the plant nutrient composition contains releasable nutrients, which are preferably extractable nutrients, comprising one or more of nitrogen, phosphorous, potassium, calcium, magnesium and sulfur. In an alternative embodiment, the ingredients contain releasable, preferably extractable, nutrients comprising one or more of iron, manganese, boron, copper, zinc, molybdenum and chlorine. Preferably, the ingredients contain all of these elements. An element is not a nutrient within the present invention unless it is present in a form that is suitable for uptake and use by a plant. Preferably, the form of the nutrient is such that the uptake and/or use of the nutrient by the plant is enhanced by the form. The nutrient may be present in an unsuitable form in the plant nutrient composition itself, provided the nutrient undergoes a change to a suitable form due to the extraction process of the present invention. In an alternative view, the ingredients comprising the plant nutrient composition preferably comprise kelp, greensand (an iron-potassium-silicate, undersea deposit), rock phosphate and fish bone meal. Preferably, the ingredients further comprise one or more of beet, carrot, zucchini, yellow yarrow, onion, parsley, and oak leaves. In another preferred embodiment, the selection of the ingredients is tailored according to the specific requirements of the geographic region in which the plant to be treated is located. Geographical and environmental factors of importance include, for example, the latitude and longitude, the length of the day, the daytime and nighttime temperatures, the regional climate and the elevation. Thus, the plant nutrient composition may comprise one or more of okra, sage, poppy seeds, ground cherry seeds, ground apple seeds, crocus leaves, tulip leaves, swamp flower, and pine shavings or sawdust. These formulations of the plant nutrient compositions are discussed further below in the Examples section.

Figure 1:
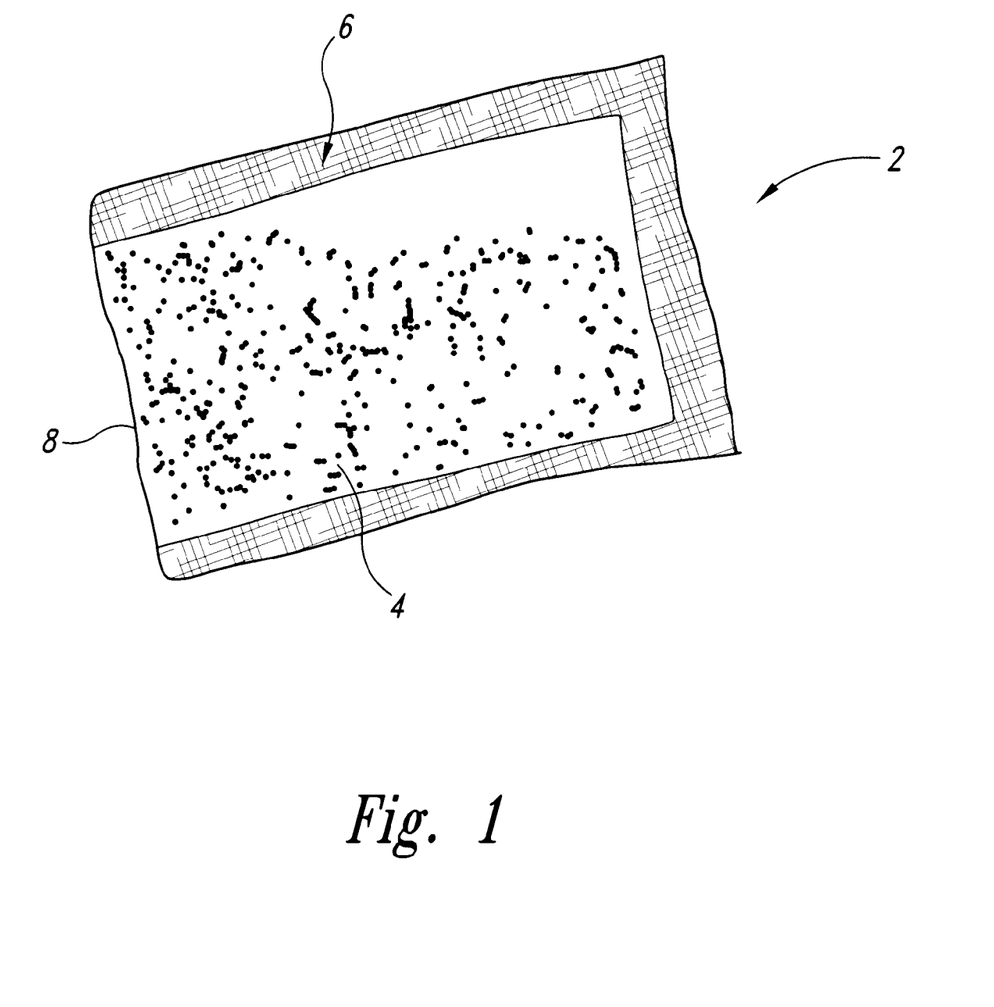
FIG. 1 depicts a top plan view of a plant nutrient delivery system containing a plant nutrient composition according to the present invention.
Figure 2:
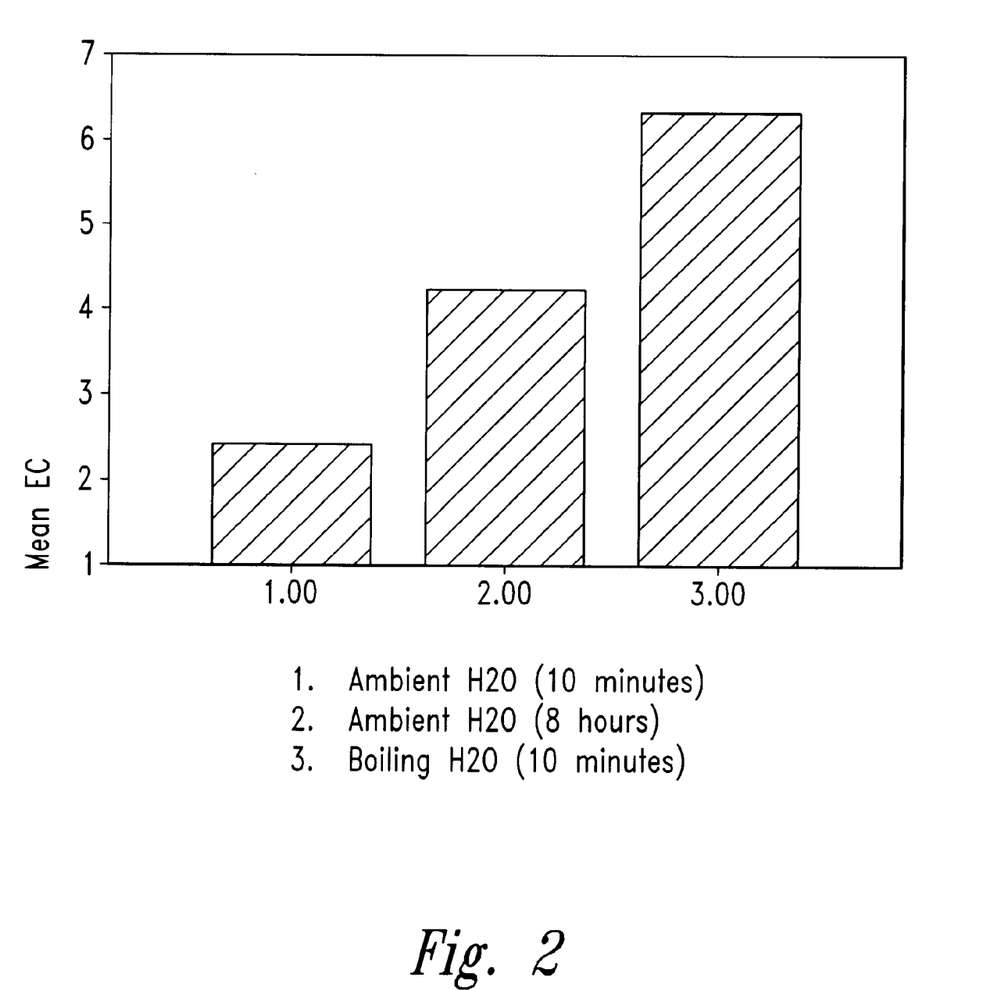
FIGS. 2–5 depict the results of four iterations of an assay to determine the effects of hot water versus cold water for releasing nutrients from the plant nutrient composition of the present invention.
Figure 3:
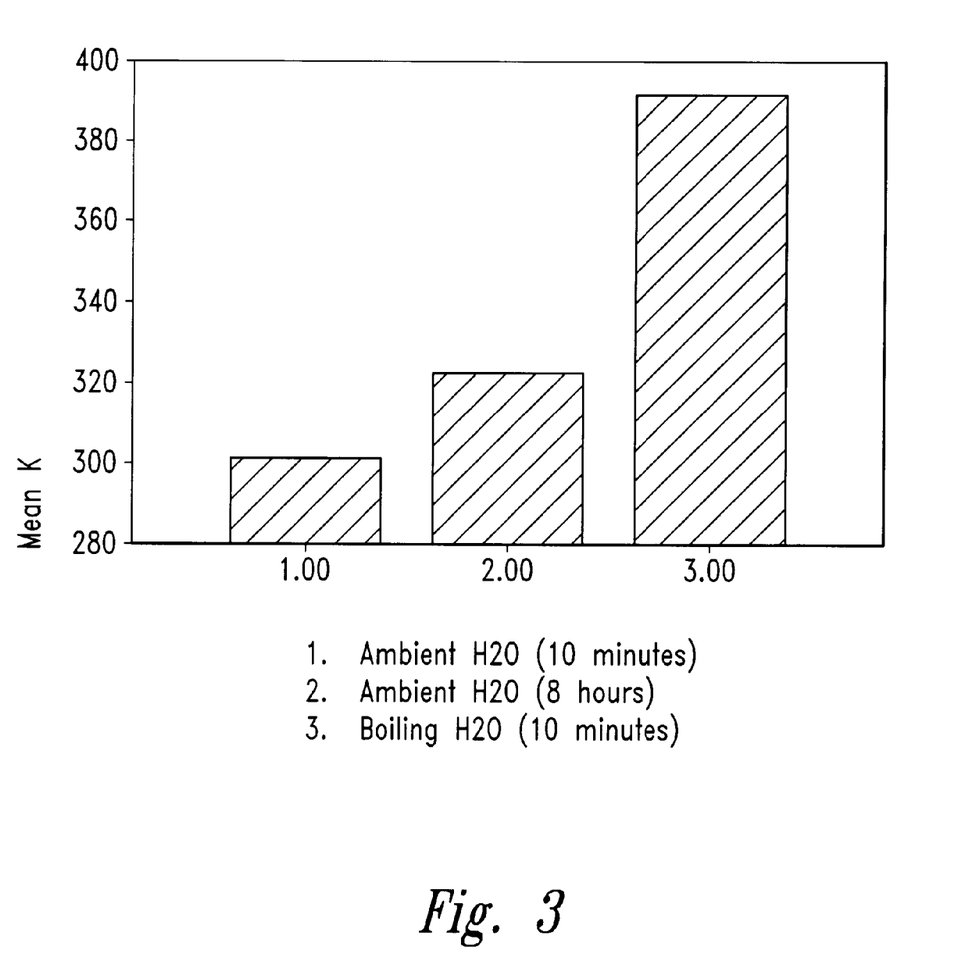
Figure 4:
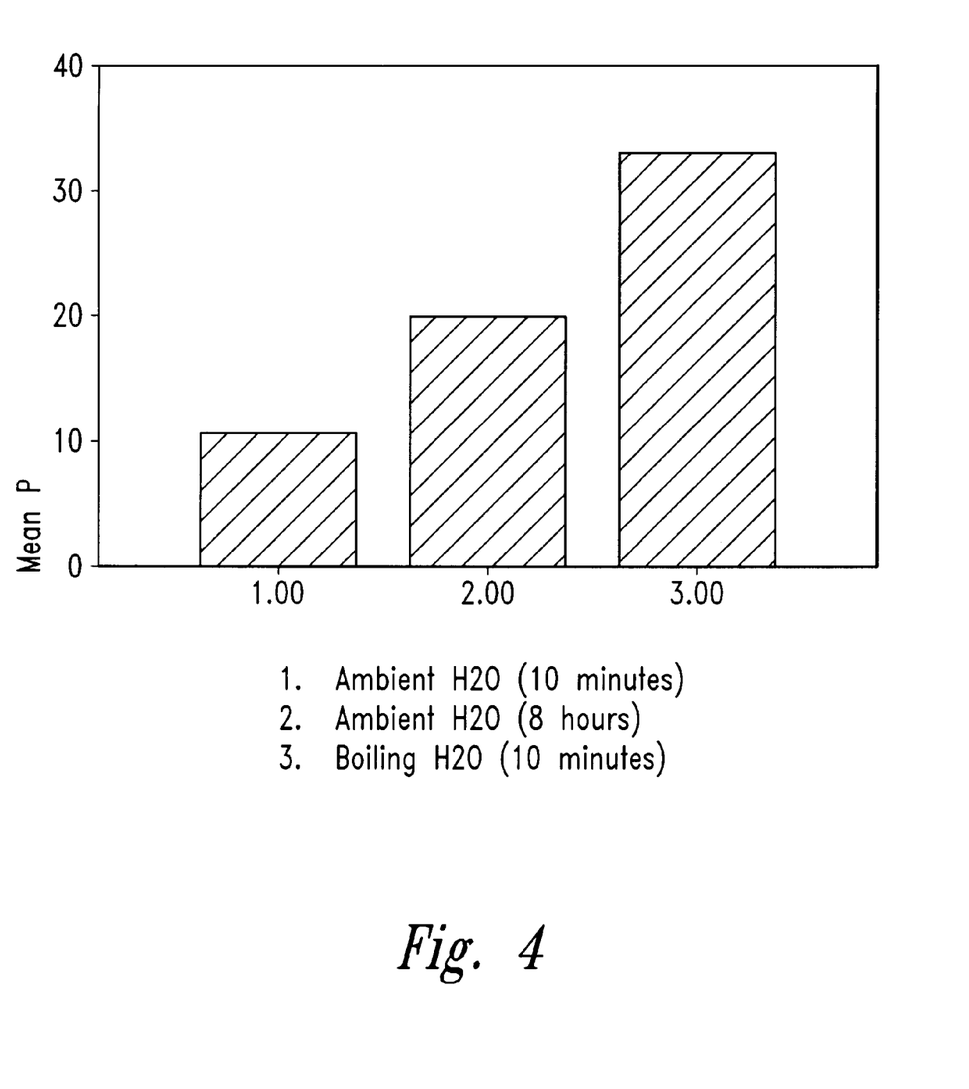
Figure 5:
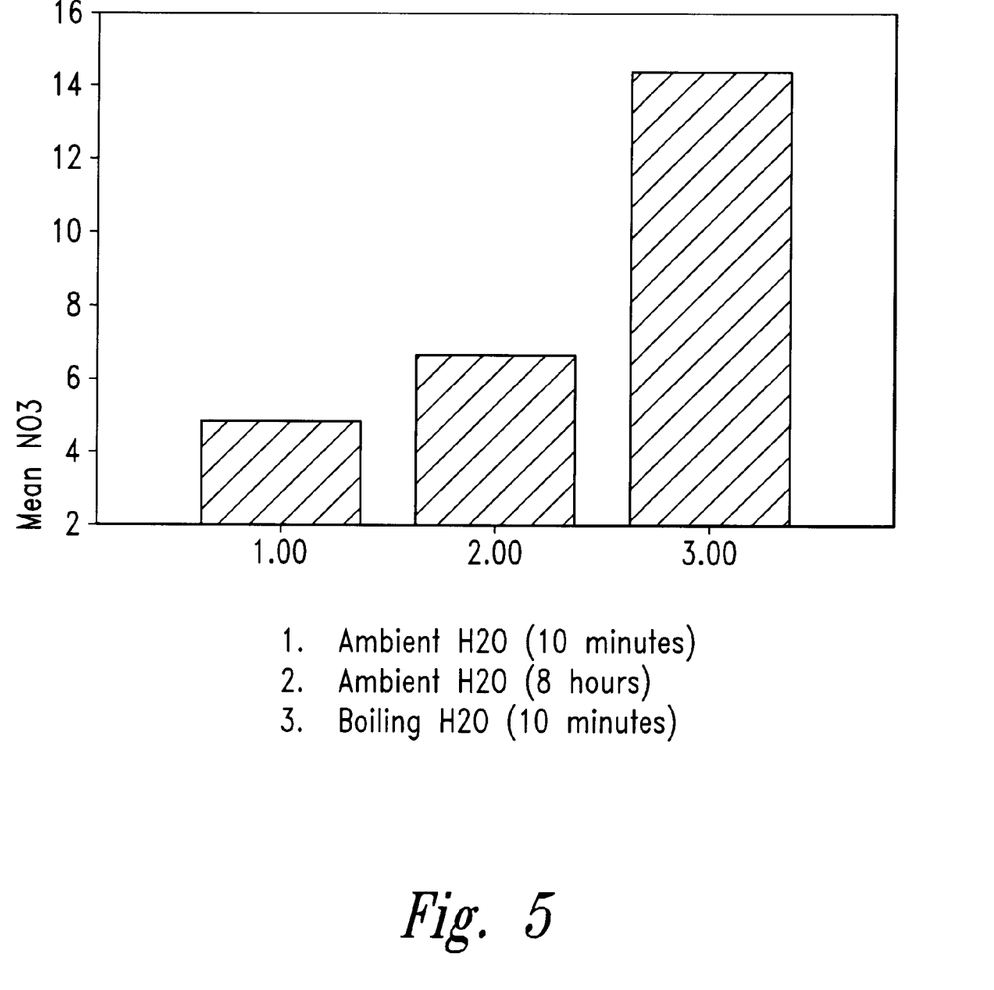

In a highly preferred embodiment, the plant nutrient composition is placed within a plant nutrient delivery system. The plant nutrient delivery system is preferably a liquid-permeable envelope, and may be produced in accordance with traditional methods of producing liquid-permeable envelopes. For example, the liquid-permeable envelopes may be produced from cotton, tree fiber pulp, or from a "tree-less" fiber such as a kenaf (*Hibiscus cannabinus*). FIG. 1 depicts one example of a plant nutrient delivery system according to the present invention. In particular, liquid-permeable envelope 2 of the plant nutrient delivery system has three sealed edges 6. Fourth edge 8 is folded, thereby allowing insertion of dry ingredients 4 through the fourth edge prior to folding (not shown).

In another aspect, the present invention provides a method of administering nutrients to plants using the plant nutrient composition, nutrient concentrate and/or plant nutrient delivery system described herein. In particular, the method includes the steps of selecting the plant nutrient composition described above, contacting the composition with hot water for a time sufficient to release the nutrients from the ingredients of the composition, to provide a nutrient concentrate comprising the water and the nutrients, and then administering the nutrient concentrate to the plants, which means that the nutrient concentrate is contacted with the plant, typically with the roots of the plant. The composition may be disposed within a liquid-permeable envelope as described herein, or it may be contacted with the water via other means such as a metallic, liquid-permeable bubble. As used herein, a "liquid-permeable" envelope or other vessel is permeable both to the hot water used to contact the plant nutrient composition, and to the nutrients (solutes) extracted from the plant nutrient composition. The residue of the composition is preferably removed from the nutrient concentrate, such as by removing the plant nutrient delivery system, or by filtration or centrifugation (particularly if the concentrate or diluted mixture is placed in a spray bottle).

Typically, the method further includes the step of cooling the mixture to about ambient temperature before administering the mixture to the plant. In alternative embodiments, the method further comprises the addition of further water to the concentrate mixture to provide a diluted mixture, and then administering the diluted mixture of the plants. Additionally, the method may further comprise storing the mixture, preferably the concentrate mixture under refrigeration, typically for up to about 2 weeks before administering the mixture to the plants.

The nutrient solution may be administered in a variety of ways. As used herein, administering to a plant includes pouring directly on the plant, or on soil adjacent to the plant, or may be transferred to an appropriate device, such as a spray bottle, and then sprayed on to the foliage of the plant.

In still yet another aspect, the present invention provides the nutrient solution, or concentrate, produced by the methods discussed herein.

In a preferred embodiment, the method of invention is performed by placing a single, water-permeable plant nutrient delivery system in a non-aluminum, heat-resistant container such as tempered glass, porcelain, stainless steel, ceramic, crockery or plastic. Two (2) cups of water that has been brought to a boil is then gently poured over the plant nutrient delivery system, and the solution is allowed to sit for about 10 minutes. The plant nutrient delivery system is then removed from the resulting infusion, and the infusion is applied either directly to the plant soil or diluted in water for use in other specific applications, as discussed above.

Exemplary administration of the concentrate obtained from the plant nutrient delivery system after immersion in 2 cups of hot water may be performed as follows. For house plants and container gardens (i.e., plants grown outdoors in hanging baskets, tubs, pots, etc.), the concentrate may be applied at the rate of about one-quarter cup per 4-inch pot every 3 weeks. For cacti and succulents, the concentrate may be administered at the rate of about one-quarter cup per 4-inch pot every 4 weeks. For vegetables, herbs and flower seedlings, it is preferred to dilute one tablespoon of concentrate and 4 cups of water to make one quart of "feeding" solution. This feeding solution may then be administered either by filling a spray bottle and use as a foliar spray, or it may be applied directly to the soil (which is the preferred method). For all examples, the amount and/or rate may be adjusted for smaller or larger containers or plants.

In another preferred embodiment, the concentrate is used to reduce the stress of "transplant shock," which is the shock inflicted upon a plant after it is moved from one location to another, particularly if the move includes the uprooting of the plant from a soil base. One example of such a transplant is the germination of seeds to seedling size in stable environments such as homes with artificial lighting, or in greenhouses, followed by transplanting seedlings to an outdoor location. Thus, the methods include, at about the time of transplanting, and preferably immediately after the time of transplanting, the administration of 2 tablespoons of concentrate diluted in 4 cups of water to make one quart of solution, followed by the administration of a small amount to each seedling or plant that has been transplanted. The ratio described above may also be used to produce large quantities of solution (i.e., the ratio is about 2 cups concentrate to about 4 gallons of water). Preferably, the water used for dilution is either rainwater, well water, or tap water that has been filtered and dechlorinated, and is free from impurities, inorganic chemicals and contaminants.

The nutrient concentrate of the present invention can also be useful for administration to rootless plants, such as fresh cut flowers. For example, the addition of a quarter cup of concentrate to water in a vase, jar, or other container used to hold cut flowers prolongs the freshness of the flowers. In another embodiment, three-quarters of a cup of the concentrate is added to the water in a Christmas tree stand (holding the Christmas tree), and three-quarters cup more of the concentrate is added about every 3 weeks thereafter. The concentrate is also useful for feeding live (i.e., rooted) Christmas trees, which comprises the administration of one cup of concentrate about every 3 weeks, either directly to soil or diluted in water used for watering the tree. The concentrate is also useful for the administration, and treatment, of weakened or damaged plants (either indoors or outdoors). In a preferred embodiment, 2 tablespoons of concentrate are diluted in 4 cups of water to make one quart of solution, and then a small amount of concentrate is applied to each seedling or plant. As above, the amount may be adjusted for either smaller or larger plants.

In another aspect, the present invention provides a kit wherein the kit includes either a plant nutrient delivery system or a plant nutrient composition, as described above, enclosed within a water-impermeable container such as a plastic or waxed paper bag or pouch. In an alternative embodiment, the plant nutrient delivery system or plant nutrient composition is in combination with a desiccant, which is a moisture absorbing material. Preferably, the desiccant is enclosed in a liquid-porous container separate from the plant nutrient delivery system. In further embodiments, the kit may include, either in addition to the desiccant or instead of the desiccant, ground quartz crystal and/or a soil moisture indicator. Indeed, the present invention includes the administration of powdered quartz crystal to a plant to enhance the health of the plant, either alone or in addition to the plant nutrient composition discussed herein.

In yet another aspect, the present invention provides a method of making a plant nutrient delivery system, including selecting a plurality of ingredients as discussed above, substantially drying the ingredients, grinding, milling and sifting the ingredients, and then placing the ingredients within a liquid-permeable envelope to produce the plant nutrient delivery system.

The following examples are offered by way of illustration, and not by way of limitation.

EXAMPLES

Example 1

Selection Of Ingredients For The Plan Nutrient Composition

A plant nutrient composition of the present invention was prepared by combining the following ingredients:

(1) Kelp: In dehydrated form. Provides potash, trade minerals, for overall health of the plant. (Down to Earth, Eugene, Oreg.; Necessary Trading, Newcastle, Va.)

(2) Greensand: An iron-potassium-silicate, undersea deposit. Sand texture. Provides silica, iron, oxides, and at least 30 trace elements. (Down to Earth, Eugene, Oreg.; Harmony Farm Supply, Sebastopol, Calif.)

(3) Rock phosphate: Powder form. Source of phosphorous, calcium, iron, sodium, magnesium, boron, and iodine. (Down to Earth, Eugene, Oreg.)

(4) Fish bone meal: Dried. A byproduct of fish meal production. Source of nitrogen, phosphorous, minerals. Provides energy. (Down to Earth, Eugene, Oreg.; Kodiak Fishmeal Co., Kodiak, Ak.)

(5) Beet: Shredded, dried and powdered. Provides energy, balance, and all-around good health. (Trout Lake Farm, Trout Lake, Wash.; Beta Pure Foods, Aptos, Calif.)

(6) Carrot: Shredded, dried and powdered. Provides energy, balance and all-around good health. (Trout Lake Farm, Trout Lake, Wash.; Beta Pure Foods, Aptos, Calif.)

(7) Zucchini: Shredded, dried, and powdered. Provides energy, balance, and all-around good health. (Ojai Organics, International, Ojai, Calif.)

(8) Yellow yarrow (*Achillea filipendulina*): Parts used: flowers and upper stems. Harvested and dried (can be replaced with pink yarrow, yellow daffodil or goldenrod if yellow yarrow in short supply). Provides strength for plants. (Spring Church, Pa.)

(9) Onion: Shredded, dried and powdered. Provides energy, balance and all-around good health. (Trout Lake Farm, Trout Lake, Wash.; Beta Pure Foods, Aptos, Calif.)

(10) Parsley: Dried and powdered. Provides all-around good health. (Trout Lake Farm, Trout Lake, Wash.; Starwest Botanicals, Rancho Cordova, Calif.)

(11) Oak leaves: Dried and shredded. Excellent moisture and nutrients retention. Source of macro- and micro-nutrients. (Whittier Fertilizer, Calif.)

Ground quartz crystal, when included, may be obtained from Coleman Mining, Jessieville, Arkansas. Preferably, these ingredients, as well as all other ingredients discussed herein, are grown, harvested and processed using organic techniques, and are free from inorganic chemical or artificial additives.

EXAMPLE 2

Variation Of Plant Nutrient Composition According To Different Geographic Regions The plant nutrient composition set forth in Example 1 is modified by adding the following components according to exemplary geographic regions located in the United States of America:

(1) South (for example, Texas, Louisiana, Mississippi, Oklahoma, Arkansas)—add to each plant nutrient delivery system ⅛ (level) teaspoon okra, dried and powdered.

(2) Southwest (for example, New Mexico, Arizona, Southern California, Colorado, Utah)—add to each plant nutrient delivery system ⅛ (level) teaspoon finely ground sage (any species), dried and shredded.

(3) West Coast (for example, parts of California)—add to each plant nutrient delivery system ⅛ (level) teaspoon ground poppy seeds.

(4) Pacific Northwest (for example, Washington, Oregon)—add to each plant nutrient delivery system ⅛ (level) teaspoon ground cherry seeds or pits, or ground apple seeds.

(5) Northeast (for example, Pennsylvania, New York, Vermont, Maine, West Virginia, Maryland, Delaware)—add to each plant nutrient delivery system ⅛ (level) teaspoon crocus leaves, dried and shredded.

(6) Midwest (for example, Ohio, Missouri, Iowa, North Dakota, South Dakota, Minnesota)—add to each plant nutrient delivery system ⅛ (level) teaspoon tulip leaves, dried and shredded.

(7) Southeast (for example, Florida, Alabama, North Carolina, South Carolina)—add to each plant nutrient delivery system ⅛ (level) teaspoon of a species of swamp flower having a white flower with a lacy fern leaf, using the foliage only.

(8) West (for example, Montana, Idaho, Wyoming)—add to each plant nutrient delivery system ⅛ (level) teaspoon pine shavings or sawdust. Shavings are preferably untreated and free from inorganic chemical additives, contaminants, or pollutants.

Example 3

Use Of The Plant Nutrient Composition With Boiled Water

The ingredients of either Example 1 or Example 2 are cut, sifted and blended to make a homogenous mixture. Eleven grams of the mixture is filled into a liquid-permeable envelope made of unbleached tree-fiber pulp. The liquid-permeable envelope is then sealed. Two cups of water are brought to a boil, then gently poured over the plant nutrient delivery system in a non-aluminum, heat-resistant container. The solution steeps for 10 minutes. The plant nutrient delivery system is removed from the resulting infusion, and the infusion is applied to the soil surrounding a plant. The plant nutrient delivery system yields about 16 ounces of nutrient concentrate, or tea (i.e., plant nutrient medium or concentrate). The nutrient concentrate is applied to the plants every 3 to 4 weeks, and the nutrient concentrate can also be stored.

Example 4

Use Of The Plant Nutrient Composition As A Sun Tea

Place 2 bags per quart of water (initially at ambient temperature) in a clear glass container. The container is covered and placed in sunlight for 8 to 12 hours until a pink-maroon color is developed. The resulting solution is then used as above.

Example 5

Comparison Of Fertilizer Solution Using Hot Water Versus Cold Water

A plant nutrient corporation prepared and placed into a series of liquid-permeable envelopes as in Example 3 above were subjected to the following extraction methods:

Method 1: An envelope was placed in 72° F. (ambient temperature) water for 10 minutes.

Method 2: An envelope was placed in 72° F. (ambient temperature) water for 8 hours.

Method 3: An envelope was placed in boiled water for 10 minutes.

Each method was performed a total of 4 times, then analyzed. Values for all elemental analyses are depicted in FIGS. 2–5, in parts per million. EC (electrolytic conductivity) is reported as ms/cm. As shown in FIGS. 2–5, the use of hot water provided significant improvement in the extraction of essential elements from the composition when compared to cold water.

From the foregoing, it will be appreciated that, although specific embodiments of the invention have been described herein for purposes of illustration, various modifications may be made without deviating from the scope and spirit of the invention. Accordingly, the invention is not limited except as by the appended claims.

I claim:

1. A plant nutrient delivery system comprising a liquid-permeable envelope containing a plurality of substantially dry ingredients that contain plant nutrients and one or more of said ingredients contains a non-nutrient, wherein said ingredients retain a plurality of said nutrients until said ingredients are contacted with water of at least about 50° C. for a sufficient time to release said plurality of said nutrients from said ingredients, and wherein said envelope retains a non-nutrient of one or more ingredients after said ingredients are contacted with said water.

2. The plant nutrient delivery system of claim 1 wherein said ingredients contain the releasable nutrients nitrogen, phosphorous, potassium, calcium, magnesium and sulfur.

3. The plant nutrient delivery system of claim 2 wherein said ingredients contain one or more releasable nutrients selected from the group consisting of iron, manganese, boron, copper, zinc, molybdenum and chlorine.

4. The plant nutrient delivery system of claim 2 wherein said ingredients comprise all of the releasable nutrients iron, manganese, boron, copper, zinc, molybdenum and chlorine.

5. The plant nutrient delivery system of claim 1 wherein said ingredients comprise kelp, greensand, rock phosphate and fish bone meal.

6. The plant nutrient system of claim 1, wherein said ingredients comprise natural organic ingredients.

7. A kit comprising:
a) a plant nutrient delivery system according to claim 1, and
b) a water-impermeable enclosure containing said plant nutrient delivery system.

8. The kit of claim 7 wherein said kit further comprises a quartz crystal powder.

9. The kit of claim 7 wherein said kit further comprises a soil moisture indicator.

10. The kit of claim 7 wherein said ingredients comprise natural organic ingredients.

11. A plant nutrient delivery systen comprising a liquid-permeable envelope containing pluurality of substantially dry ingredients that contain plant nutrients, wherein said ingredients retain a plurality if said nutriens until said ingradients are contacted with water of at least about 50° C. for a sufficient time to release said plurality of said nutrients from said ingredients, and wherein sadi ingredients comprise kelp;, greensad, rok phosphate, fish bone meal, beet, carrot, zucchini, yellow yarrow, onion, parsley, and oak leaves.

12. The plant nutrient delivery system of claim 11, wherein said ingredients further comprise at least one substance selected from the group consisting of okra, sage, poppy seeds, ground cherry seeds, ground apple seeds, crocus leaves, tulip leaves, swamp flower, pine shavings, and sawdust.

13. A kit comprising:
a) a plant nutrient delivery system according to claim 11, and
b) a water-impermeable enclosure containing said plant nutrient delivery system.

14. The kit of claim 13, wherein said ingredients further comprise at least one substance selected from the group consisting of okra, sage, poppy seeds, ground cherry seeds, ground apple seeds, crocus leaves, tulip leaves, swamp flower, pine shavings, and sawdust.

* * * * *